US008911123B2

(12) United States Patent
Shih et al.

(10) Patent No.: US 8,911,123 B2
(45) Date of Patent: Dec. 16, 2014

(54) ASSEMBLING STRUCTURE AND LIGHTING DEVICE WITH ASSEMBLING STRUCTURE

(71) Applicant: Industrial Technology Research Institute, Hsinchu (TW)

(72) Inventors: Chin-Ming Shih, Hsinchu (TW); Song-Bor Chiang, New Taipei (TW); Jun-Chun Wong, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 49 days.

(21) Appl. No.: 13/781,094

(22) Filed: Feb. 28, 2013

(65) Prior Publication Data

US 2014/0160771 A1 Jun. 12, 2014

(30) Foreign Application Priority Data

Dec. 12, 2012 (TW) ............................ 101146981 A

(51) Int. Cl.
*B60Q 1/00* (2006.01)
*F21V 21/00* (2006.01)
*F21V 15/01* (2006.01)

(52) U.S. Cl.
CPC ................ *F21V 15/01* (2013.01); *F21V 21/00* (2013.01)
USPC .......................................................... 362/368

(58) Field of Classification Search
USPC ..................................... 362/368; 248/222.51
See application file for complete search history.

(56) References Cited

U.S. PATENT DOCUMENTS

| | | | |
|---|---|---|---|
| 6,787,999 | B2 | 9/2004 | Stimac et al. |
| 7,329,024 | B2 | 2/2008 | Lynch et al. |
| 7,762,829 | B2 | 7/2010 | Daily et al. |
| 7,784,969 | B2 | 8/2010 | Reisenauer et al. |
| 7,806,575 | B2 | 10/2010 | Willwohl et al. |
| 7,828,465 | B2 | 11/2010 | Roberge et al. |
| 7,888,851 | B2 | 2/2011 | Yang et al. |

(Continued)

FOREIGN PATENT DOCUMENTS

| | | |
|---|---|---|
| EP | 2284440 A1 * | 2/2011 |
| TW | 200421635 | 10/2004 |

(Continued)

OTHER PUBLICATIONS

Moo Whan Shin, Thermal design of high-power LED package and system, Proc. of SPIE, 2006, p. 635509-1-635509-13, vol. 6355.

(Continued)

*Primary Examiner* — Evan Dzierzynski
(74) *Attorney, Agent, or Firm* — Morris Manning & Martin LLP; Tim Tingkang Xia, Esq.

(57) ABSTRACT

An assembling structure includes a base, an assembling body and a fastening element. The base has a ring groove. The assembling body includes at least two first fastening portions. The fastening element is disposed inside the ring groove and can be rotatably installed on the base. The fastening element includes at least two second fastening portions. The fastening element can rotate relative to the base and has a fastening position and a releasing position. When the fastening element is at the fastening position, the two first fastening portions are fastened with the two second fastening portions respectively. When the fastening element is at the releasing position, the two first fastening portions are detached from the two second fastening portions respectively.

15 Claims, 14 Drawing Sheets

(56) References Cited

U.S. PATENT DOCUMENTS

| | | | | |
|---|---|---|---|---|
| 7,959,332 | B2 | 6/2011 | Tickner et al. | |
| 7,972,036 | B1 | 7/2011 | Schach et al. | |
| 8,480,268 | B2 * | 7/2013 | Wilson et al. | 362/365 |
| 2008/0231201 | A1 | 9/2008 | Higley et al. | |
| 2008/0304269 | A1 | 12/2008 | Pickard et al. | |
| 2012/0106177 | A1 * | 5/2012 | Blankestijn et al. | 362/382 |

FOREIGN PATENT DOCUMENTS

| | | | |
|---|---|---|---|
| TW | 20064710 | | 7/2006 |
| TW | M364281 | U | 9/2009 |
| TW | I318461 | B | 12/2009 |
| TW | 201007075 | | 2/2010 |
| TW | 201022574 | | 6/2010 |
| TW | M398081 | U | 2/2011 |
| TW | 201111737 | | 4/2011 |
| TW | M402992 | | 5/2011 |
| TW | M406688 | | 7/2011 |
| TW | M409356 | | 8/2011 |
| TW | I363849 | B | 5/2012 |

OTHER PUBLICATIONS

Wei-Hao Chi et al., Analysis of Thermal and Luminous Performance of MR-16 LED Lighting Module, IEEE transactions on components and packaging technologies, 2010, p. 713-721, vol. 33, No. 4.

Jui-Ching Hsieh et al., Optimization of Thermal Management by Integration of an SCGM, a Finite-Element Method , and an Experiment on a High-Power LED Array, IEEE Transactions on Electron Devices, 2011, p. 1141-1148, vol. 58, No. 4.

Bongtae Han et al., Coupled Thermal and Thermo-Mechanical Design Assessment of High Power Light Emitting Diode, IEEE transactions on components and packaging technologies, 2010, p. 688-697, vol. 33, No. 4.

H.-S. Huang et al., Experimental investigation of vapor chamber module applied to high-power light-emitting diodes, Experimental Heat Transfer, 2009, p. 26-38, vol. 22.

Song-Bor Chiang, The Development of the Tunable LED PAR Lamp.

Song-Bor Chiang et al., The Appearance Design and Thermal Issues of the Modularized LED Lighting Lamp, p. 1-8.

Dae-Whan Kim et al., Direct Submount Cooling of High-Power LEDs, IEEE transactions on components and packaging technologies, 2010, p. 698-712, vol. 33, No. 4.

* cited by examiner

ASSEMBLING STRUCTURE AND LIGHTING DEVICE WITH ASSEMBLING STRUCTURE

CROSS-REFERENCE TO RELATED APPLICATIONS

This non-provisional application claims priority under 35 U.S.C. §119(a) on Patent Application No(s). 101146981 filed in Taiwan, R.O.C. on Dec. 12, 2012, the entire contents of which are hereby incorporated by reference.

TECHNICAL FIELD

The disclosure relates to an assembling structure and a lighting device.

BACKGROUND

Changes on social pattern, rapid technological advancement, increase in environmental awareness and progress on environmental concepts have made energy conservation and carbon reduction to become important issues and targets to achieve for most countries in the world. As a result, since the invention of the white light emitting diode (LED) and the white organic light emitting diode (OLED) in the 90's, the light emitting diode has become the best product for replacing conventional light bulbs because it is energy-saving, environmental friendly, mercury-free, compact, applicable in low temperature environments, directional. Furthermore, the light emitting diode produces less light pollution and has a wide color gamut.

A conventional iodine tungsten lamp, a high pressure sodium lamp, an incandescent lamp and a fluorescent lamp are usually used for urban street lightings. Because the photoelectric conversion efficiencies of conventional streets lights are lower than that of the light emitting diode and conventional streets lights consume a larger amount of electricity, and a tremendous amount of energy is wasted. Therefore, the power and energy saving light emitting diode streets lights with a longer life expectancy are gradually replacing the conventional streets lights.

However, it is very inconvenient in the assembling of conventional light emitting diode light and the light socket together. For instance, a conventional light emitting diode light is firstly rotated to a coupling position, and then a plurality of screws is used to lock the light emitting diode light with a light socket. Assembling in such a way requires a large amount of time. Furthermore, light emitting diode lights that are used for street lights are relatively bulky in size with a heavier weight, which are much more inconvenient in assembling. Therefore, it is highly demanded for developers to develop a light emitting diode light which can be conveniently assembled.

SUMMARY

In an embodiment, the disclosure provides an assembling structure comprising a base, an assembling body and a fastening element. The base has a ring groove. The assembling body comprises at least two first fastening portions. The fastening element is disposed inside the ring groove and rotatably installed on the base. The fastening element comprises at least two second fastening portions. The fastening element is configured for rotating relative to the base and having a fastening position and a releasing position. When the fastening element is at the fastening position, the two first fastening portions are fastened with the two second fastening portions respectively. When the fastening element is at the releasing position, the two first fastening portions are detached from the two second fastening portions respectively.

The disclosure further provides a lighting device comprising a frame, a light source and an assembling structure. The assembling structure is installed on the frame. The assembling structure comprises a base, an assembling body and a fastening element. The base is installed on the frame and has a ring groove. The assembling body comprises at least two first fastening portions. The assembling body has an opening. The light source is installed at the opening of the assembling body. The fastening element is disposed in the ring groove and is rotatably installed on the base. The fastening element comprises at least two second fastening portions. The fastening element is configured for rotating relative to the base and has a fastening position and a releasing position. When the fastening element is at the fastening position, the two first fastening portions are fastened with the two second fastening portions respectively. When the fastening element is at the releasing position, the two first fastening portions are detached from the two second fastening portions respectively.

BRIEF DESCRIPTION OF THE DRAWINGS

The disclosure will become more fully understood from the detailed description given herein below for illustration only and thus does not limit the disclosure, wherein.

DETAILED DESCRIPTION

Figure 1:
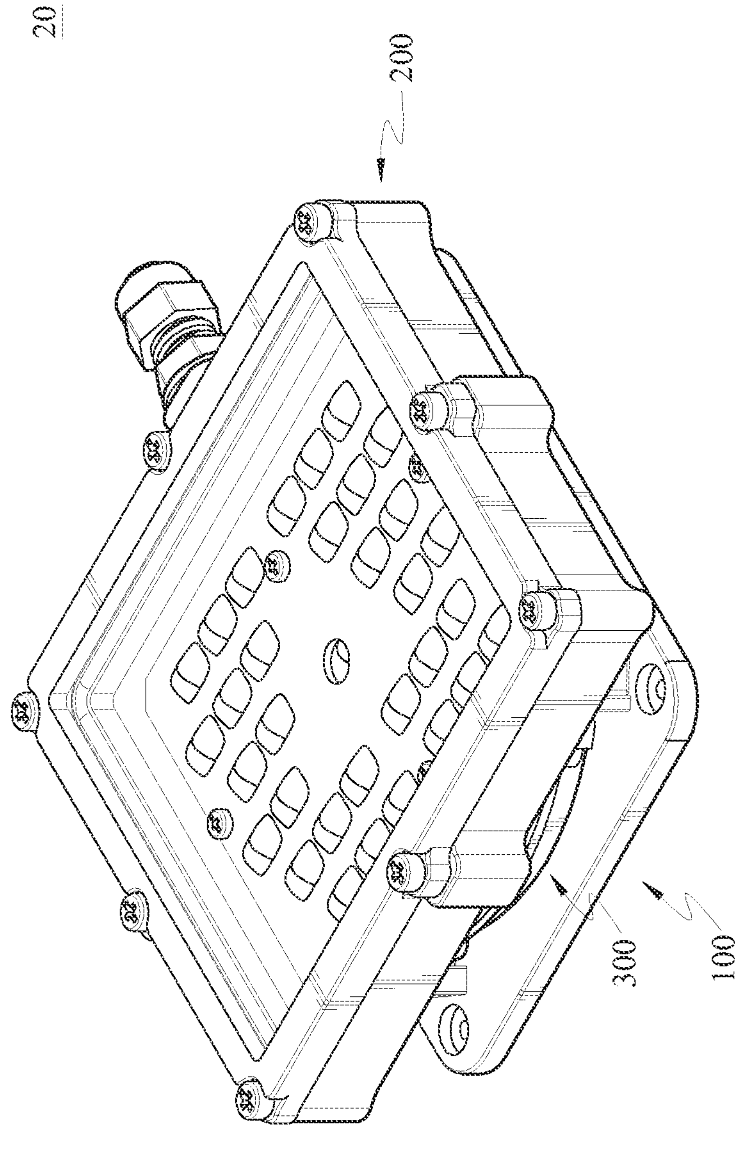
FIG. 1 is a perspective view of an assembling structure according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
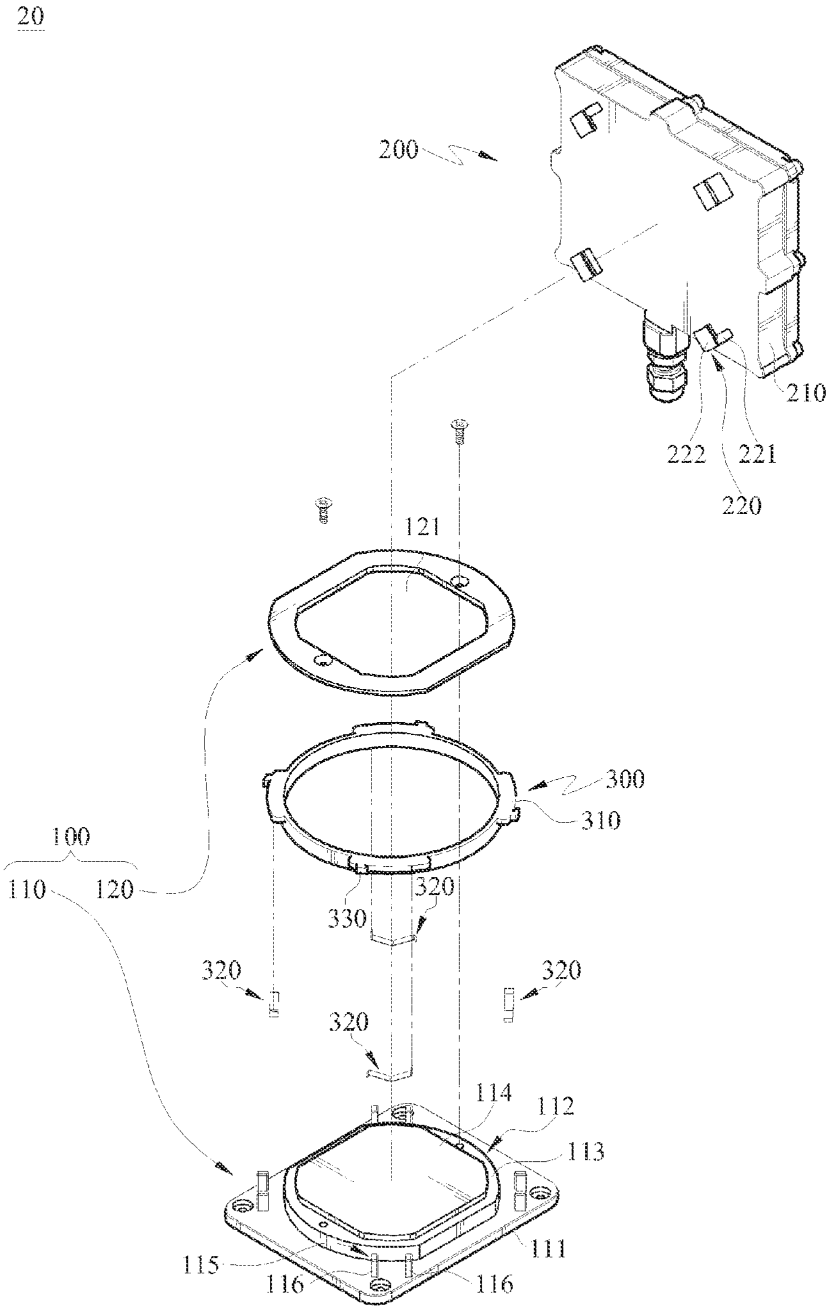
FIG. 2 is an exploded view of FIG. 1.
Figure 3:
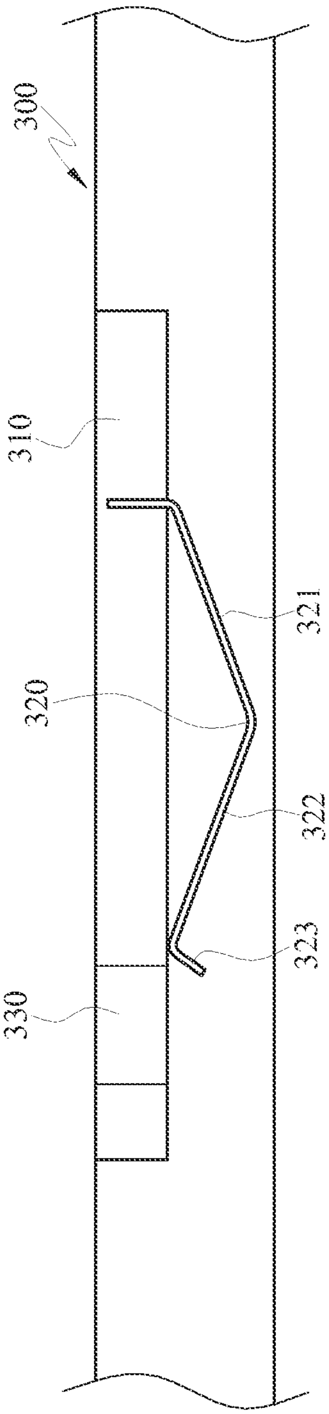
FIG. 3 is a partial plan view of a fastening element in FIG. 2.
Figure 4A:
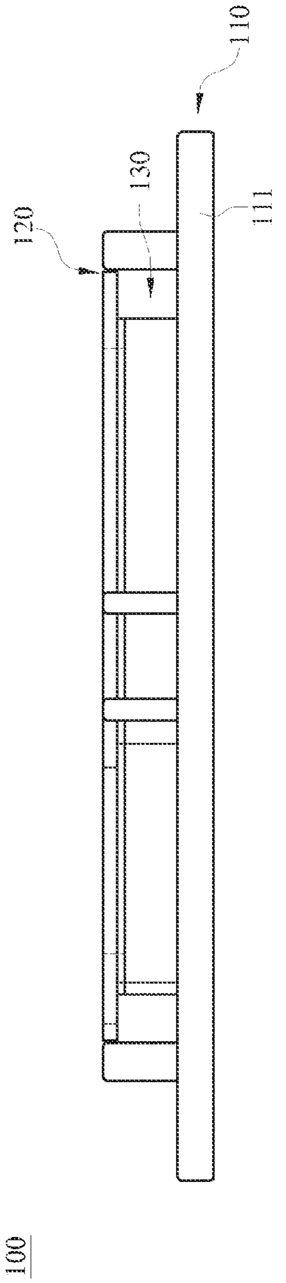
FIG. 4A is a plan view of the combination of a bottom base and a limitation plate in FIG. 2.
Figure 4B:
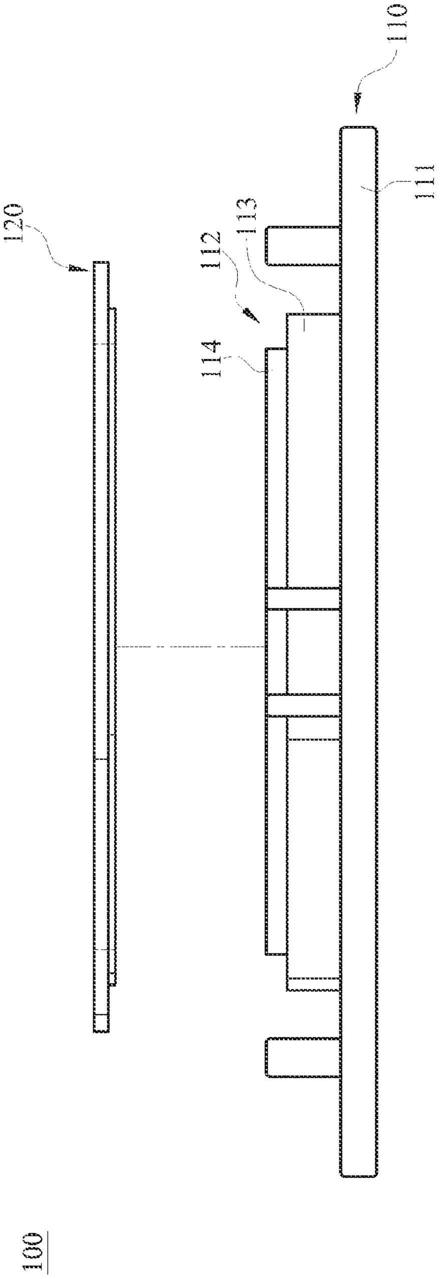
FIG. 4B is an exploded view of FIG. 4A.

Please refer to FIGS. 1 to 4B. FIG. 1 is a perspective view of an assembling structure according to a first embodiment of the disclosure. FIG. 2 is an exploded view of FIG. 1. FIG. 3 is a partial plan view of a fastening element in FIG. 2. FIG. 4A is a plan view of the combination of a bottom base and a limitation plate in FIG. 2. FIG. 4B is an exploded view of FIG. 4A.

An assembling structure 20 of this embodiment comprises a base 100, an assembling body 200 and a fastening element 300. The base 100 has a ring groove 130. The assembling body 200 comprises at least two first fastening portions 220. The fastening element 300 is located inside the ring groove 130 and rotatably installed on the base 100. The fastening element 300 comprises at least two second fastening portions 320. The fastening element 300 is configured for rotating relative to the base 100 and therefore has a fastening position and a releasing position. When the fastening element 300 is at the fastening position, the two first fastening portions 220 are fastened with the two second fastening portions 320 respectively. When the fastening element 300 is at the releasing position, the two first fastening portions 220 are detached from the two second fastening portions 320 respectively. Thereby, a user is able to speedily install the assembling body 200 on the base 100 or dismount the assembling body 200 from the base 100 by rotating the fastening element 300. In this embodiment, the quantity of the at least two first fastening portions 220 and the at least two second fastening portions 320 is four but this should not be construed as limitations to the disclosure. In other embodiments, the quantity can be three or more than five respectively. Furthermore, in this embodiment, the base 100, the assembling body 200 and the fastening element 300 are, for examples, made of metal or other thermal conductive materials. The disclosure is not limited thereto.

The base 100 comprises a bottom base 110 and a limitation plate 120. The bottom base 110 comprises a base portion 111 and a protruding portion 112. The protruding portion 112 is disposed protrudingly on the base portion 111. The limitation plate 120 is installed on a side of the protruding portion 112 further away from the base portion 111 in order to keep a distance between the limitation plate 120 and the base portion 111 and thereby to form the ring groove 130 (as shown in FIG. 4A). Thereby, the fastening element 300 is allowed to install in the ring groove 130 between the limitation plate 120 and the base portion 111. In this embodiment, the protruding portion 112 comprises an installation piece 113 and a protruding piece 114. The installation piece 113 is disposed protrudingly on the base portion 111. The protruding piece 114 is disposed protrudingly on the installation piece 113. The fastening element 300 is sleevably disposed around the installation piece 113 and is configured for rotating within the ring groove 130. In this embodiment, the limitation plate 120 has a through hole 121 and a size of the through hole 121 fits a size of the protruding piece 114, or is slightly larger than the size of the protruding piece 114. A thickness of the limitation plate 120 is approximately equal to a height that the protruding piece 114 protruded from the installation piece 113. When the limitation plate 120 is installed on the installation piece 113, the through hole 121 exposes the protruding piece 114. At this point, the limitation plate 120 and the protruding piece 114 are coplanar, and a distance is kept between the limitation plate 120 and the base portion 111 to form the ring groove 130.

In this embodiment, the assembling body 200 comprises a case 210. The first fastening portions 220 are disposed on the case 210. Each of the first fastening portions 220 comprises a supporting arm 221 and a fastening arm 222. The supporting arm 221 is erected on a surface of the case 210. The fastening arm 222 is protruded from an end of the supporting arm 221, and a distance is kept between the fastening arm 222 and the case 210. Furthermore, in other embodiments, the first fastening portions 220 may be fastening hooks.

The fastening element 300 comprises at least two detent portions 310. Each of the second fastening portions 320 is disposed on the corresponding detent portion 310 and faces the base 100. Each of the second fastening portions 320 comprises a first elastic arm 321 and a second elastic arm 322. The first elastic arms 321 and the second elastic arms 322 are disposed between the detent portions 310 and the bottom base 110. The first elastic arms 321 are connected to the detent portions 310 and extend toward the bottom base 110. The second elastic arms 322 are connected to the first elastic arms 321 and extend in a direction further away from the bottom base 110. When the fastening element 300 is at the fastening position, the fastening arms 222 are disposed between the bottom base 110 and the second elastic arms 322. The second elastic arms 322 are pressed against the fastening arms 222 in order to force the assembling body 200 to attach on the protruding piece 114 of the base 100. Furthermore, in other embodiments, the second fastening portions 320 may be fastening hooks matching with the first fastening portions 220 in order that the assembling body 200 is configured for being installed on the base 100.

In this embodiment and other embodiments, each of the second fastening portions 320 further comprises a bent arm 323. The bent arms 323 are connected to the second elastic arms 322 and extend toward the bottom base 110. When the second fastening portions 320 are pressed against the fastening arms 222, the bent arms 323 slide along the wall surfaces of the detent portions 310.

In this embodiment and other embodiments, each of the supporting arms 221 is disposed on an outer edge of each of the detent portions 310, and each of the fastening arms 222 extends from an end of each of the supporting arms 221 toward the detent portions 310.

In this embodiment and other embodiments, the base 100 further comprises four limitation sets 115. Each of the limitation sets 115 comprises two limitation elements 116. The limitation sets 115 sandwich the corresponding supporting arm 221 between the limitation elements 116 respectively in order to limit free movements between the assembling body 200 and the base 100 horizontally.

In this embodiment and some other embodiments, the fastening element 300 further comprises at least one limitation piece 330. The limitation piece 330 protrudes from the outer edge of the detent portion 310 toward a direction further away from the protruding portion 112. In other words, the limitation piece 330 protrudes radially from the outer edge of the detent portion 310. When the fastening element 300 is at the fastening position, the limitation piece 330 is pressed against one of the limitation sets 115. In this embodiment, the quantity of the limitation piece 330 is four. The disclosure is not limited thereto. In other embodiments, the quantity of the limitation piece 330 may be one or more than one.

Figure 5A:
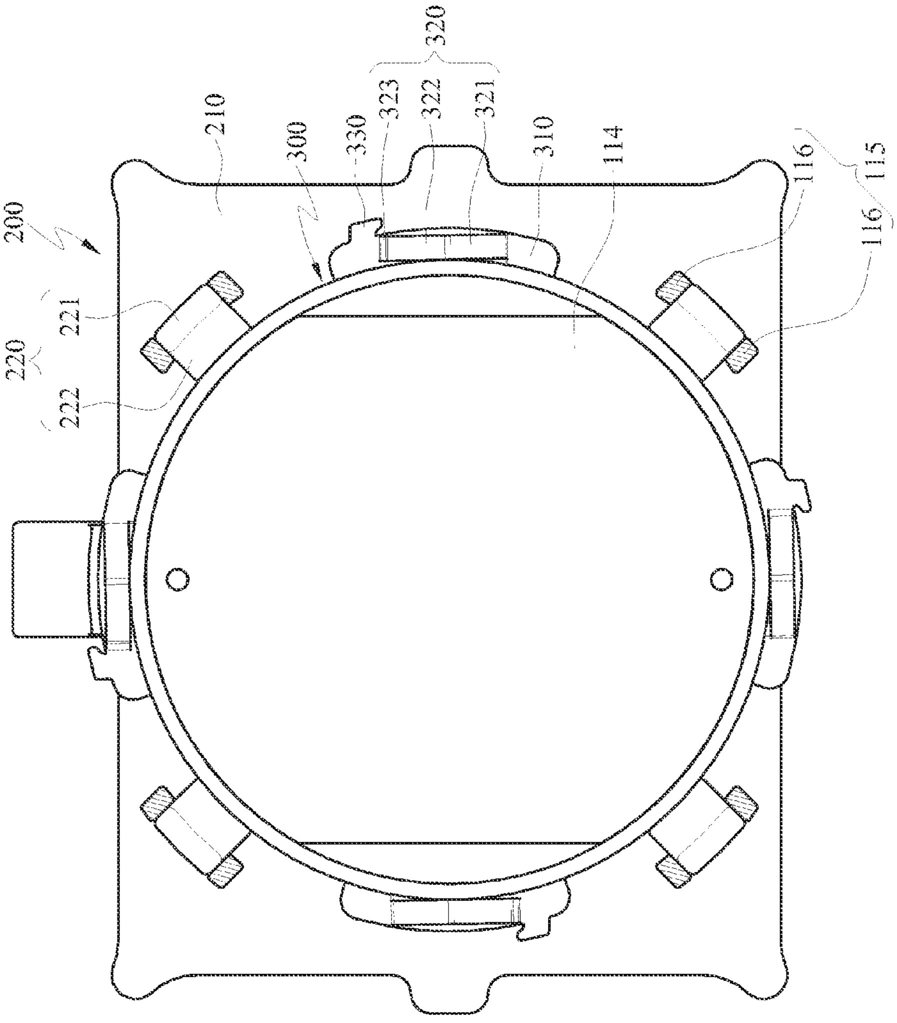
FIGS. 5A and 5B are assembly illustrations of FIG. 1.
Figure 5B:
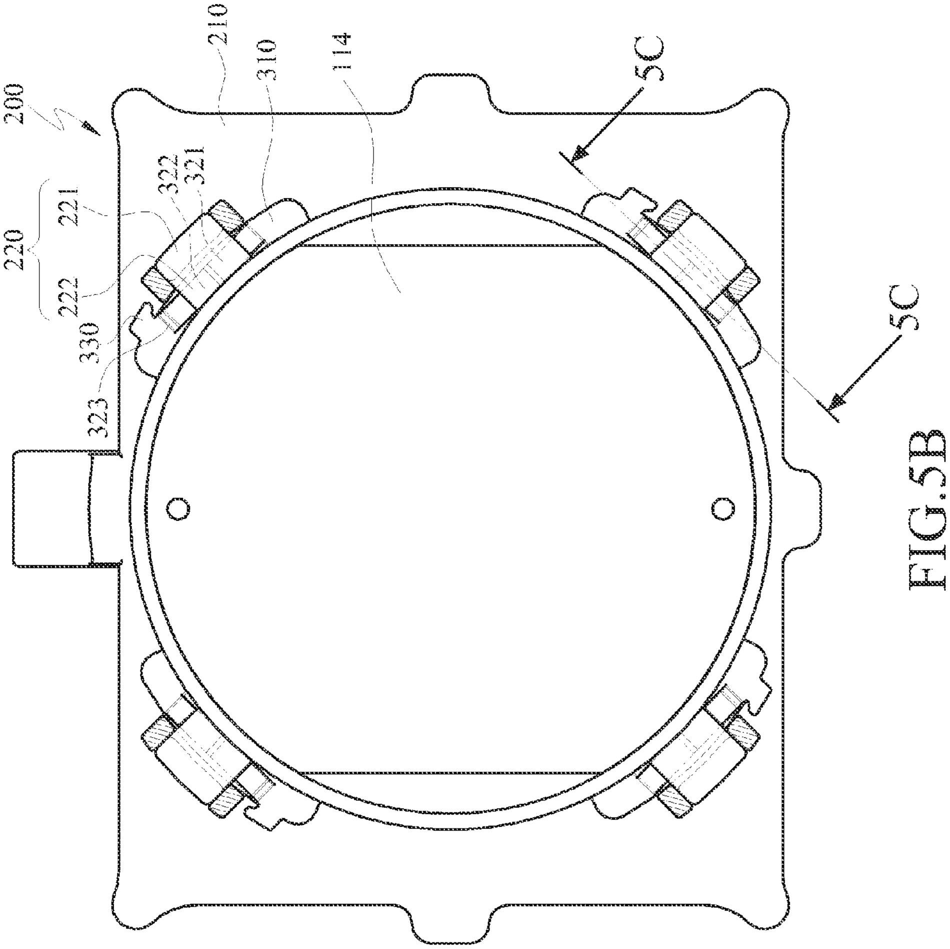
Figure 5C:
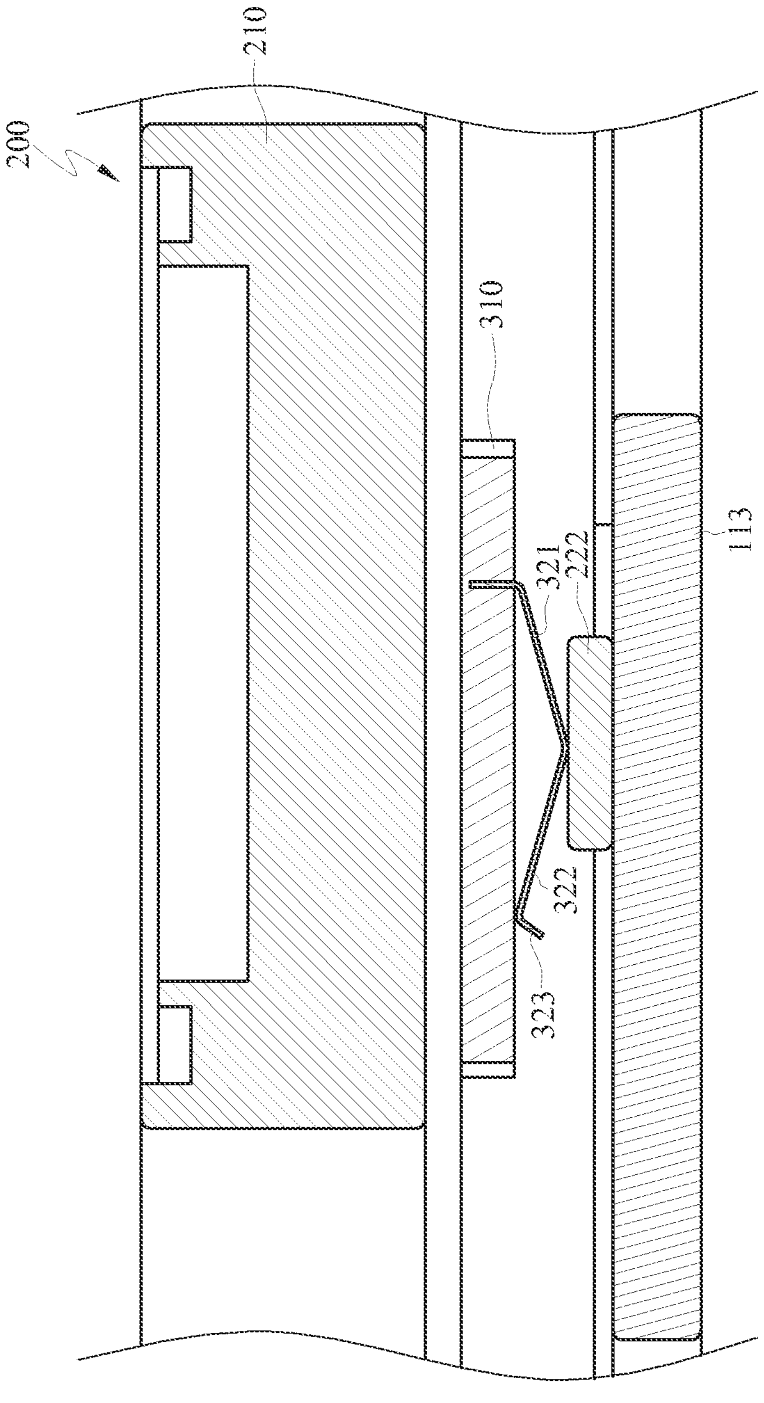
FIG. 5C is a sectional view of FIG. 5B along sectional line 5C-5C.

Please refer to FIGS. 5A to 5C. FIGS. 5A and 5B are assembly illustrations of FIG. 1. FIG. 5C is a sectional view of FIG. 5B along sectional line 5C-5C. In order to explicitly show the fastening relationship between the first fastening portions 220 and the second fastening portions 320, the case 210 of the assembling body 200 is omitted in FIGS. 5A and 5B, and only the second fastening portions 320 are illustrated.

Firstly, the fastening element 300 is adjusted to the releasing position, and the assembling body 200 is disposed on the base 100. In other words, the supporting arm 221 of each of the first fastening portions 220 is disposed between the two limitation elements 116 of each of the limitation sets 115, and each of the second fastening portions 320 is pressed against the detect portions 310 respectively (as shown in FIG. 5A). Then, the fastening element 300 is rotated to the fastening position from the releasing position. During the rotation, the second fastening portions 320 are pressed by the fastening arms 222 to deform elastically. In other words, the first elastic arms 321 and the second elastic arms 322 are made relatively flat because of the pressing, and an elastic restoring force is produced and exerted against the bottom base 110. Therefore, the elastic restoring force forces the case 210 of the assembling body 200 to move towards the bottom base 110 and to tightly attach onto the protruding piece 114 of the base 100 (as shown in FIGS. 5B and 5C). Thereby, when the user needs to assemble the assembling body 200 with the base 100 or dismount the assembling body 200 from the base 100, the assembling body 200 can be speedily assembled on the base 100 tightly or dismounted from the base 100 simply by rotating the fastening element 300 without having to rotate the assembling body 200.

The base 100 and the assembling body 200 of this embodiment are made of metal or other thermal conductive materials. Thereby, if components, which produce heat, are installed inside the assembling body 200, the efficiency of thermal conduction between the assembling body 200 and the base 100 is able to be enhanced by the tight attachment between the assembling body 200 and the base 100.

Figure 6:
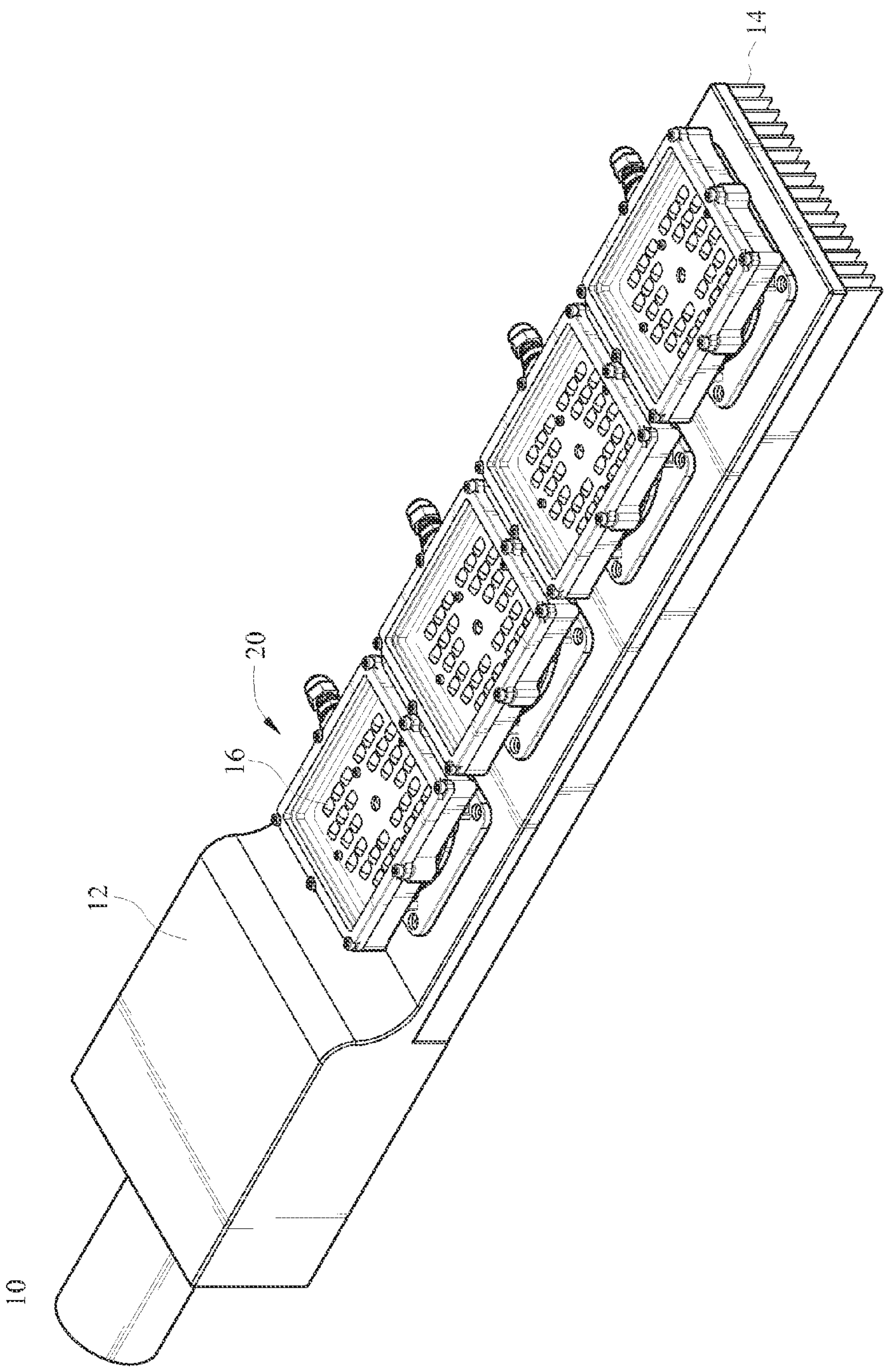
FIG. 6 is a perspective view of a lighting device according to a second embodiment of the disclosure.
Figure 7:
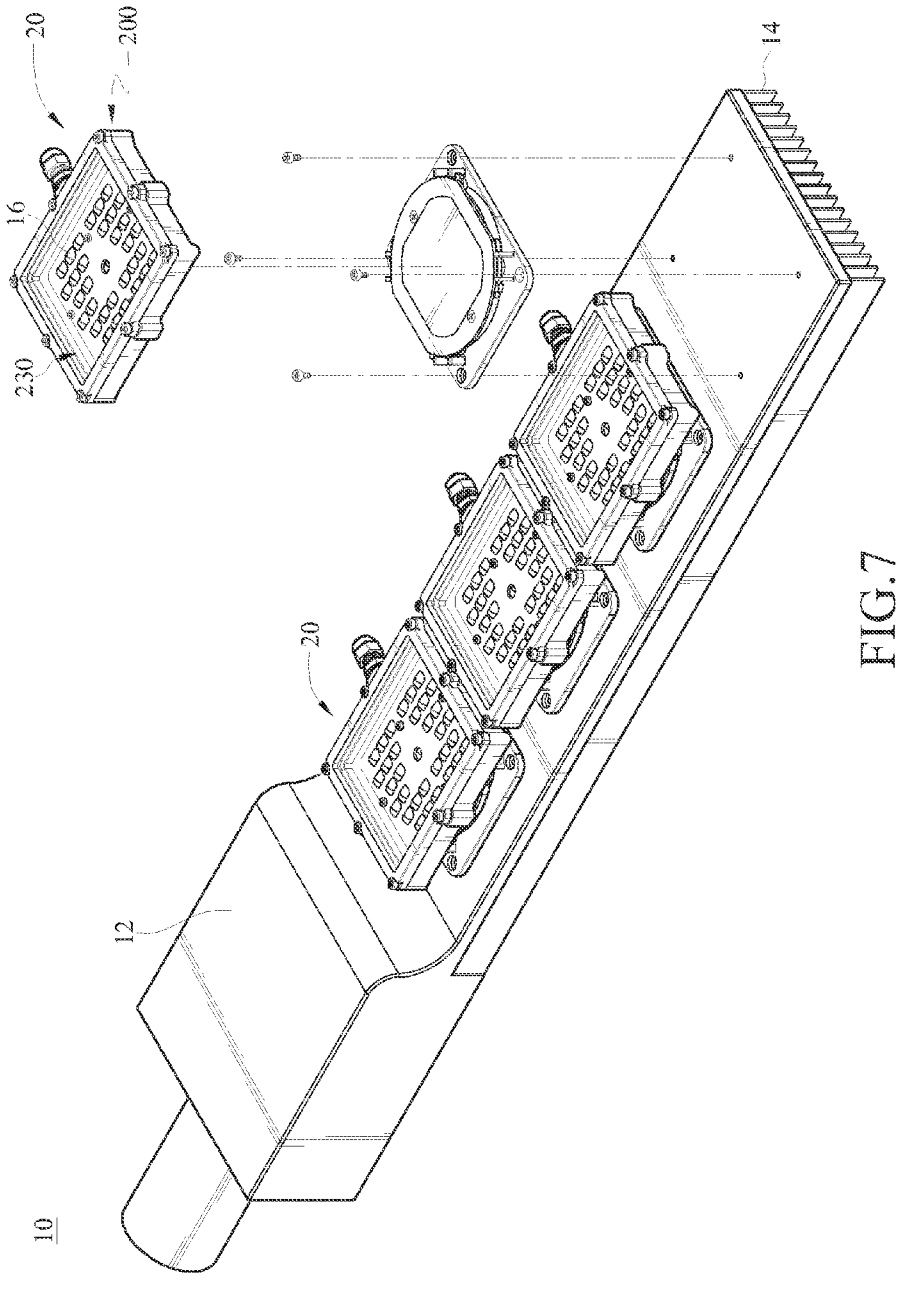
FIG. 7 is an exploded view of FIG. 6.

Please refer to FIGS. 1, 2, 6 and 7. FIG. 6 is a perspective view of a lighting device according to a second embodiment of the disclosure. FIG. 7 is an exploded view of FIG. 6.

A lighting device 10 of this embodiment comprises a frame 12, a light source 16 and an assembling structure 20. Because the assembling structure 20 is similar to that in the embodiment in FIG. 1, similar parts will not be described herein again, and only the relationships between the frame 12, the light source 16 and the assembling structure 20 are described hereinafter. The assembling structure 20 of this embodiment is installed on the frame 12, and the light source 16 is disposed on the assembling structure 20.

In this embodiment, the frame 12 is made of metal. Furthermore, the frame 12 comprises a fin assembly 14 configured for being in thermal contact with the base 100 in order to enhance the heat dissipation efficiency of the frame 12. In this and some other embodiments, the light source 16 is a light emitting diode (LED) or an organic light emitting diode (OLED), but the disclosure is not limited thereto.

The assembling structure 20 comprises the base 100, the assembling body 200 and the fastening element 300. The base 100 is installed on the frame 12. The assembling body 200, installed with the light source 16, is installed on the base 100 through the fastening element 300. Since the assembling body 200 of this embodiment has an opening 230, the light source 16 is installed at the opening 230 of the assembling body 200 in order that the light source 16 is able to emit light from the opening 230.

Figure 8A:
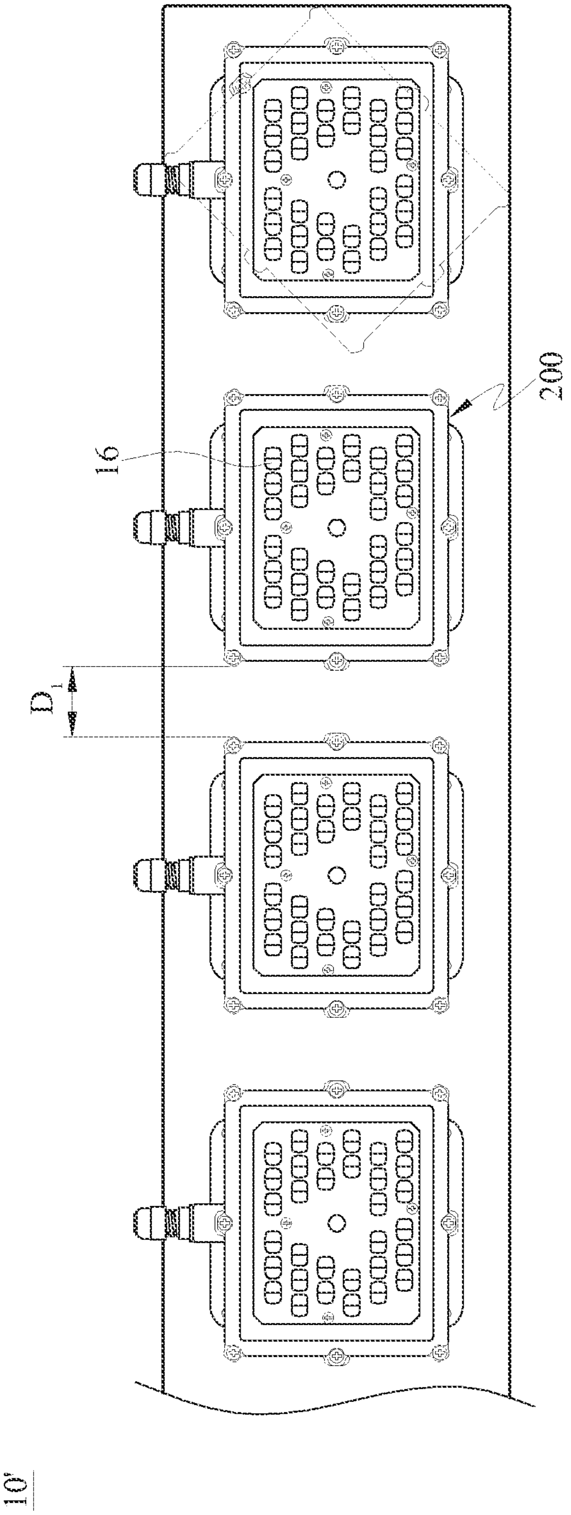
FIG. 8A is a plan view of the lighting device without the fastening elements.
Figure 8B:
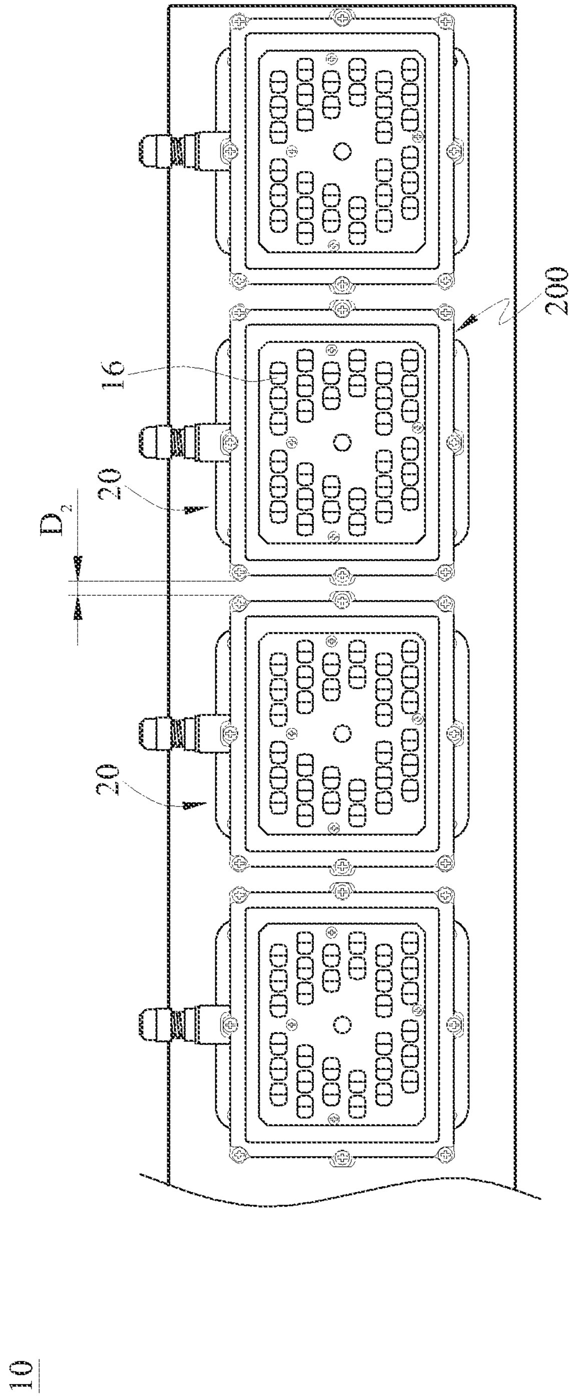
FIG. 8B is a plan view of the lighting device with the fastening elements.

Please refer to FIGS. 8A and 8B. FIG. 8A is a plan view of the lighting device without the fastening elements. FIG. 8B is a plan view of the lighting device with the fastening elements. Firstly, as shown in FIG. 8A, when a lighting device 10' is not installed with the fastening elements 300 and the user needs to install the assembling body 200, installed with the light source 16, on the base 100, the user needs to rotate the assembling body 200 in order to couple the assembling body 200 on the base 100. The assembling body 200 is usually designed in a square shape in order to meet the optical characteristics, but the disclosure is not limited thereto. Therefore, in the designing of the lighting device 10', a distance D1 has to be reserved between each of the bases 100 in order that an adequate assembling space are provided for rotating the assembling body 200 and installing the assembling body 200 on the base 100. Therefore, the illuminating effects may be affected due to the possible effects on the designing of the optical characteristics of the lighting device 10'. The optical characteristics are referred to brightness, illuminance and uniformity of illumination of a lighting device. Furthermore, a weight of the assembling body 200 also affects the assembling efficiency of the lighting device 10'. For instance, when a size of the assembling body 200 is relatively larger, and the assembling body 200 is relatively heavier, it is less easy for the assembling staff to rotate the assembling body 200 in order to install the assembling body 200 on the base 100.

As shown in FIG. 8B, because the lighting device 10 of this embodiment is installed with the fastening elements 300, when the user needs to assemble the assembling body 200, installed with the light source 16, on the base 100, the assembling body 200, installed with the light source 16, is configured for being speedily assembled on the base 100 simply by rotating the fastening element 300 without having to rotate the assembling body 200. Furthermore, since it is only required to rotate the fastening element 300 and is not required to rotate the assembling body 200 during the assembling process, a distance D2 reserved between each of the bases 100 of the lighting device 10 with the fastening elements 300 is able to be designed to be far smaller than the distance D1 reserved between each of the bases 100 of the lighting device 10' without the fastening elements 300. Thereby, the designing for the optical characteristics of the lighting device 10 can be performed more conveniently.

Figure 9A:
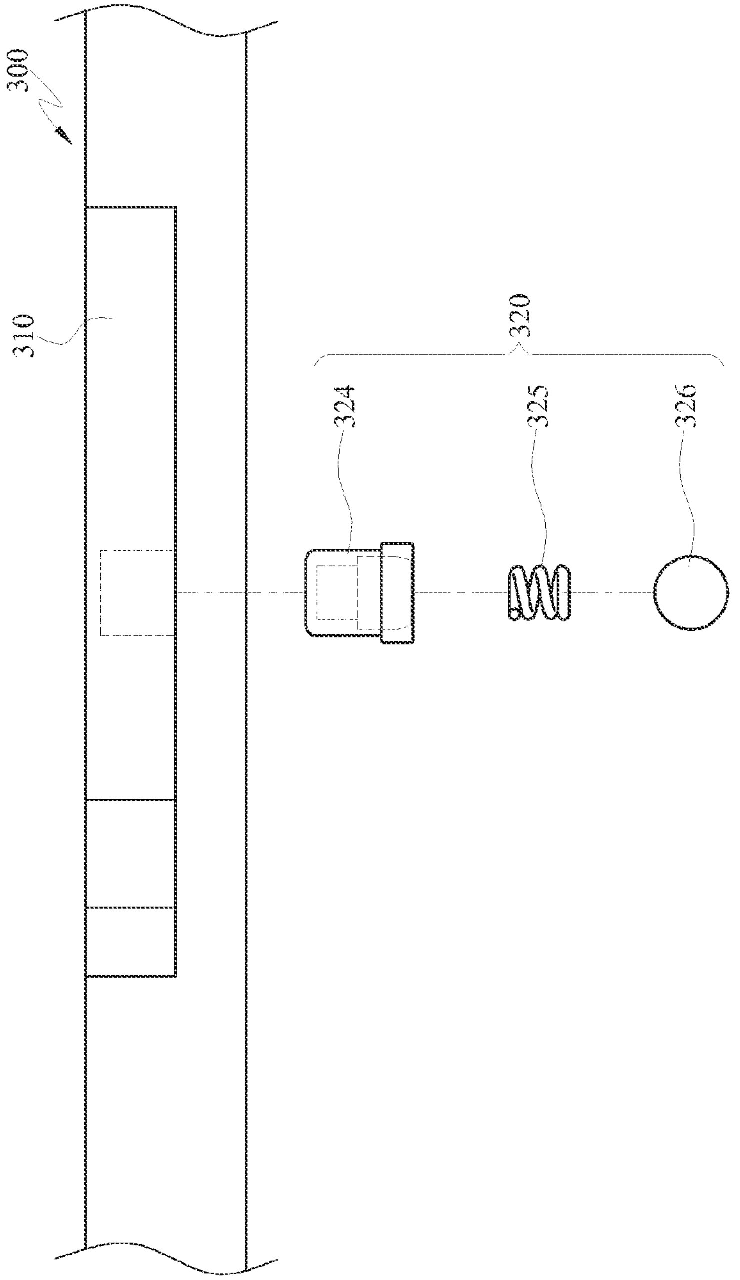
FIG. 9A is an exploded plan view of the fastening element according to a third embodiment of the disclosure.
Figure 9B:
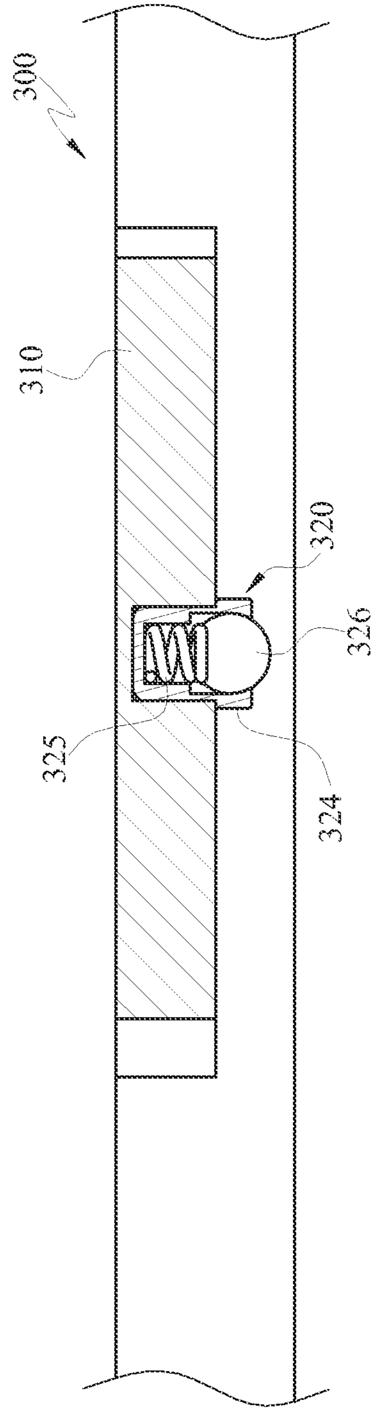
FIG. 9B is a sectional assembly view of FIG. 9A.

In the embodiment in FIG. 2, the second fastening portions 320 are structured with the elastic arms. It should not be construed as a limitation of the disclosure. In other embodiments, the second fastening portions 320 may also be other fastening structures. Please refer to FIGS. 9A and 9B. FIG. 9A is an exploded plan view of the fastening element according to a third embodiment of the disclosure. FIG. 9B is a sectional assembly view of FIG. 9A. This embodiment is similar to the embodiment in FIG. 2, and therefore only the differences of the second fastening portions 320 will be described hereinafter. The second fastening portion 320 of this embodiment comprises an assembling sleeve 324, an elastic element 325 and a pressing element 326. The assembling sleeve 324 is disposed in the detent portion 310. The elastic element 325 and the pressing element 326 are installed in the assembling sleeve 324. The pressing element 326 is pushed against by the elastic element 325 to press against the bottom base 110.

Figure 10:
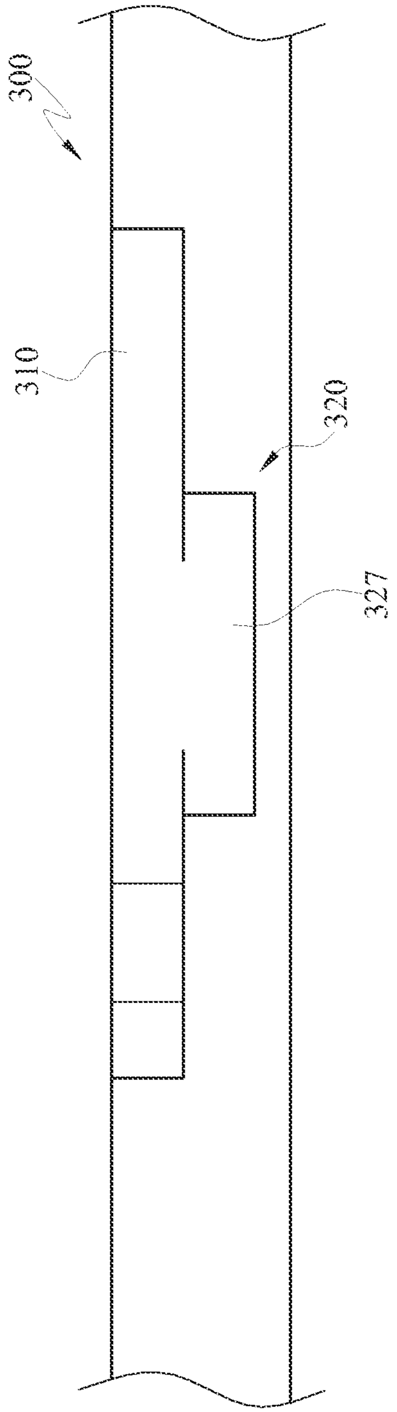
FIG. 10 is a plan view of the fastening element according to a fourth embodiment of the disclosure.

Please refer to FIG. 10. FIG. 10 is a plan view of the fastening element according to a fourth embodiment of the disclosure. The second fastening portion 320 of this embodiment comprises a pressing piece 327. The pressing piece 327 protrudes from the detent portion 310 towards the bottom base 110.

According to the assembling structure and the lighting device with the assembling structure disclosed by the disclosure, the fastening element is configured for being rotatably installed on the base, and the second fastening portions of the fastening element may be speedily fastened with the first fastening portions of the assembling body in order to achieve the assembling between the base and the assembling body simply by rotating the fastening element. Thereby, the efficiency of assembling between the base and the assembling body can be enhanced.

Furthermore, because it is only required to rotate the fastening element and not required to rotate the assembling body during the assembling between the base and the assembling body, a distance reserved between each of the bases is able to be reduced. Thereby, the designing for the optical characteristics of the lighting device is capable to be performed more conveniently.

Furthermore, because the second fastening portions are elastic, when the second fastening portions are pressed against the first fastening portions, the assembling body is forced to tightly attach on the base for enhancing the heat dissipation efficiency between the assembling body and the base.

What is claimed is:

1. An assembling structure, comprising:

a base having a ring groove and comprising a bottom base and a limitation plate, wherein the bottom base comprises a base portion and a protruding portion, the protruding portion is disposed protrudingly on the base portion, and the limitation plate is installed on a side of the protruding portion further away from the base portion for keeping a distance between the limitation plate and the base portion so as to form the ring groove;

an assembling body comprising at least two first fastening portions; and a fastening element disposed inside the ring groove and rotatably installed on the base, the fastening element comprising at least two second fastening portions, the fastening element being configured for rotating relative to the base, the fastening element having a fastening position and a releasing position, wherein when the fastening element is at the fastening position, the two first fastening portions are fastened with the two second fastening portions respectively, while when the fastening element is at the releasing position, the two first fastening portions are detached from the two second fastening portions respectively.

2. The assembling structure as claimed in claim 1, wherein the protruding portion comprises an installation piece and a protruding piece, the installation piece is disposed protrudingly on the base portion, and the protruding piece is disposed protrudingly on the installation piece, the limitation plate is installed on the installation piece and the distance is kept between the limitation plate and the base portion.

3. The assembling structure as claimed in claim 2, wherein the assembling body comprises a case, the first fastening portion comprises a supporting arm and a fastening arm, the supporting arm is erected on a surface of the case, the fastening arm is protruded from an end of the supporting arm, and a distance is kept between the fastening arm and the case, the fastening element comprises at least two detent portions, the second fastening portion is disposed on the corresponding detent portion and faces the base, the second fastening portion comprises a first elastic arm and a second elastic arm, the first elastic arms and the second elastic arms are disposed between the detent portions and the bottom base, the first elastic arms are connected to the detent portions and extended toward the bottom base, the second elastic arms are connected to the first elastic arms and extended in a direction further away from the bottom base, when the fastening element is at the fastening position, the fastening arms are disposed between the bottom base and the second elastic arms, the second elastic arms are pressed against the fastening arms.

4. The assembling structure as claimed in claim 3, wherein the supporting arm is disposed on an outer edge of the detent portion, and the fastening arm is extended from an end of the supporting arm toward the detent portion.

5. The assembling structure as claimed in claim 3, wherein the second fastening portion further comprises a bent arm, the bent arms are connected to the second elastic arms and extended toward the bottom base.

6. The assembling structure as claimed in claim 3, wherein the base further comprises two limitation sets, the limitation set comprises two limitation elements, the two limitation sets sandwich the two corresponding supporting arms between the two limitation elements respectively.

7. The assembling structure as claimed in claim 3, wherein the fastening element further comprises at least one limitation piece, the limitation piece is protruded from the outer edge of the detent portion toward a direction further away from the protruding portion, when the fastening element is at the fastening position, the limitation piece is pressed against the limitation set.

8. A lighting device, comprising:

a frame;

a light source; and an assembling structure installed on the frame, comprising:

a base installed on the frame, having a ring groove and comprising a bottom base and a limitation plate, wherein the bottom base comprises a base portion and a protruding portion, the protruding portion is disposed protrudingly on the base portion, the limitation plate is installed on a side of the protruding portion further away from the base portion for keeping a distance between the limitation plate and the base portion, so as to form the ring groove;

an assembling body comprising at least two first fastening portions, the assembling body having an opening, the light source being installed at the opening of the assembling body; and a fastening element disposed in the ring groove and rotatably installed on the base, the fastening element comprising at least two second fastening portions, the fastening element being configured for rotating relative to the base, the fastening element having a fastening position and a releasing position, wherein when the fastening element is at the fastening position, the two first fastening portions are fastened with the two second fastening portions respectively, while when the fastening element is at the releasing position, the two first fastening portions are detached from the two second fastening portions respectively.

9. The lighting device as claimed in claim 8, wherein the protruding portion comprises an installation piece and a protruding piece, the installation piece is disposed protrudingly on the base portion, and the protruding piece is disposed protrudingly on the installation piece, the limitation plate is installed on the installation piece and the distance is kept between the limitation plate and the base portion.

10. The lighting device as claimed in claim 9, wherein the assembling body further comprises a case, the first fastening portion comprises a supporting arm and a fastening arm, the supporting arm is erected on a surface of the case, the fastening arm is protruded from an end of the supporting arm, and a distance is kept between the fastening arm and the case, the fastening element comprises at least two detent portions, the second fastening portion is disposed on the corresponding detent portion and faces the base, the second fastening portion comprises a first elastic arm and a second elastic arm, the first elastic arms and the second elastic arms are disposed between the detent portions and the bottom base, the first elastic arms are connected to the detent portions and extended toward the bottom base, the second elastic arms are connected to the first elastic arms and extended in a direction further away from the bottom base, when the fastening element is at the fastening position, the fastening arms are disposed between the bottom base and the second elastic arms, the second elastic arms are pressed against the fastening arms.

11. The lighting device as claimed in claim 10, wherein the supporting arm is disposed on an outer edge of the detent portion, and the fastening arm is extended from an end of the supporting arm toward the detent portion.

12. The lighting device as claimed in claim 10, wherein the second fastening portion further comprises a bent arm, the bent arms are connected to the second elastic arms and extend toward the bottom base.

13. The lighting device as claimed in claim 10, wherein the base further comprises two limitation sets, the limitation set comprises two limitation elements, the two limitation sets sandwich the two corresponding supporting arms between the two limitation elements respectively.

14. The lighting device as claimed in claim 10, wherein the fastening element further comprises a limitation piece, the limitation piece is protruded from the outer edge of the detent portion toward a direction further away from the protruding portion, when the fastening element is at the fastening position, the limitation piece is pressed against the limitation set.

15. The lighting device as claimed in claim 8, wherein the frame further comprises a fin assembly being in thermal contact with the base.

* * * * *